Oct. 26, 1937. L. V. CASTO ET AL 2,096,730
SURFACE DECORATING METHOD AND MACHINE
Filed Aug. 29, 1935 4 Sheets-Sheet 4

INVENTORS
LLOYD V. CASTO
GUIDO VON WEBERN
EDWARD W. HAMANT
ORVILLE DOERING KING
BY Bates, Goldrick &Teare
ATTORNEYS Patented Oct. 26, 1937

2,096,730

UNITED STATES PATENT OFFICE 2,096,730

SURFACE DECORATING METHOD AND MACHINE

Lloyd V. Casto, Detroit, Mich., and Guido von Webern, Edward William Hamant, and Orville Doering King, Dayton, Ohio; said von Webern, Hamant and King assignors to Oxford Varnish Corporation, Detroit, Mich., a corporation of Michigan Application August 29, 1935, Serial No. 38,358

44 Claims. (Cl. 101—35)

This invention relates to an improved method, machine and apparatus for applying decorative color material, to work of various shapes, and particularly for the decoration of parts having relatively raised, (as cylindrically convex) surfaces, in other words, surfaces deviating from a common plane, with respect to the article to be decorated. An object is to provide a method, machine and apparatus for decorating work of the above character in an expeditious manner.

A further object is to provide a machine for decorating the exposed surfaces of open frames, such as sheet metal automobile window frames and the like, in which the work and the decorating mechanism per se are relatively arranged so that the decorative treatment may be applied without substantial distortion of image or pattern as a continuous operation for the entire extent of such interior surfaces.

A further object is to provide a method and apparatus for applying decorative treatment, as to continuous (i. e. endless) articles, in such manner that there will be no perceptible joint in the applied design or pattern at any part of the work. More specifically the invention contemplates the elimination of gaps and overlaps in the applied decorative coating.

The invention further contemplates the provision of a machine which will operate effectively to decorate moldings, tubes and the like on the desired surfaces.

The objects further include a novel arrangement, in a work decorating machine, for supporting work in such manner that the work may move with respect to the decorating mechanism in the proper manner to secure the desired surface decoration thereon; to provide an improved offset printing mechanism for effecting intaglio and allied classes of offset printing; the provision of scraper and/or doctor blade supports, so arranged that at no time will the machine operate improperly by reason of carelessness on part of the operator in setting such parts either in starting up or shutting down the operation of the machine.

Other objects and features of the invention will become apparent from the following description relating to the accompanying drawings, showing the preferred form of machine and apparatus hereof. The essential characteristics are summarized in the claims.

Figure 1:
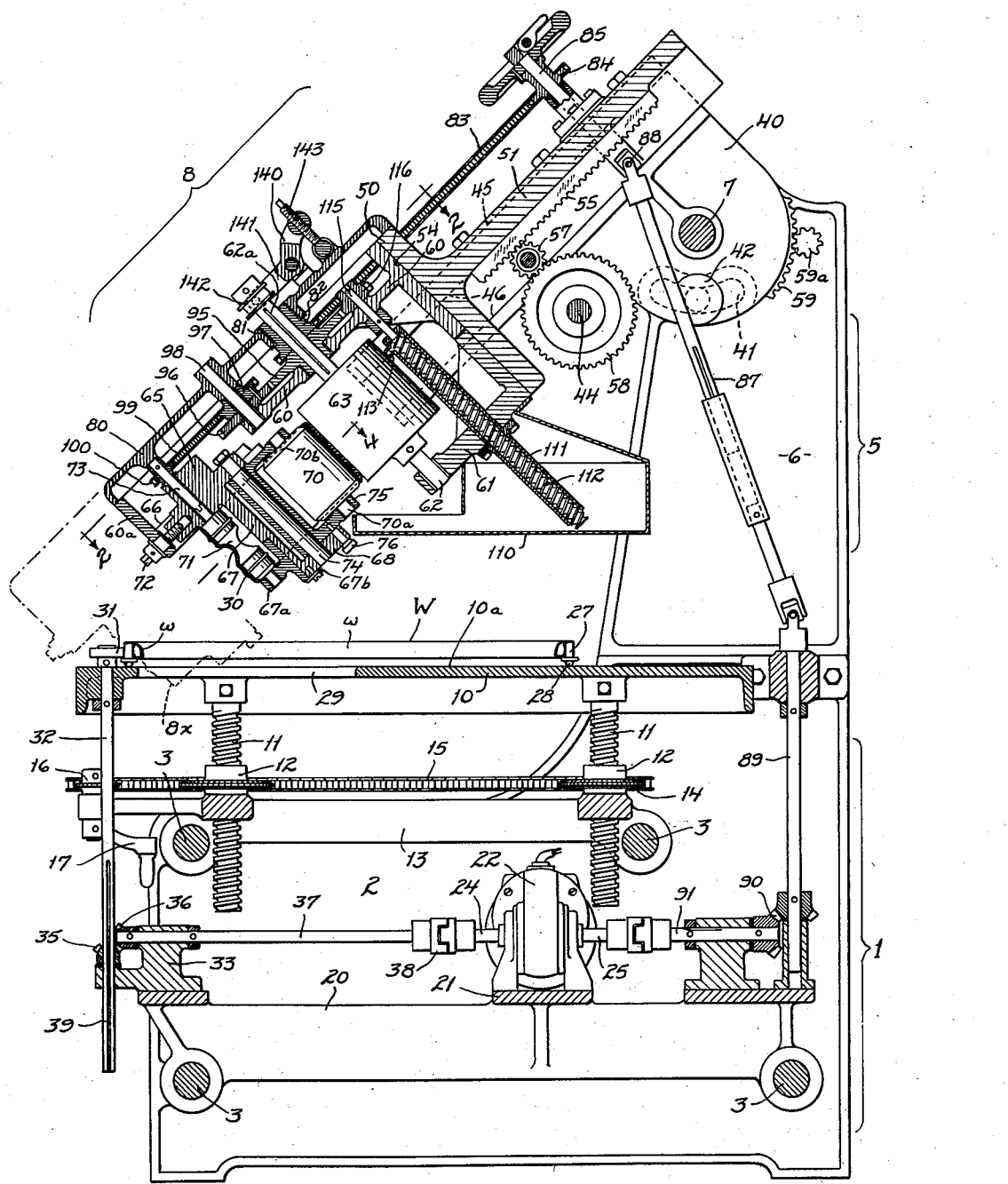
Figure 2:
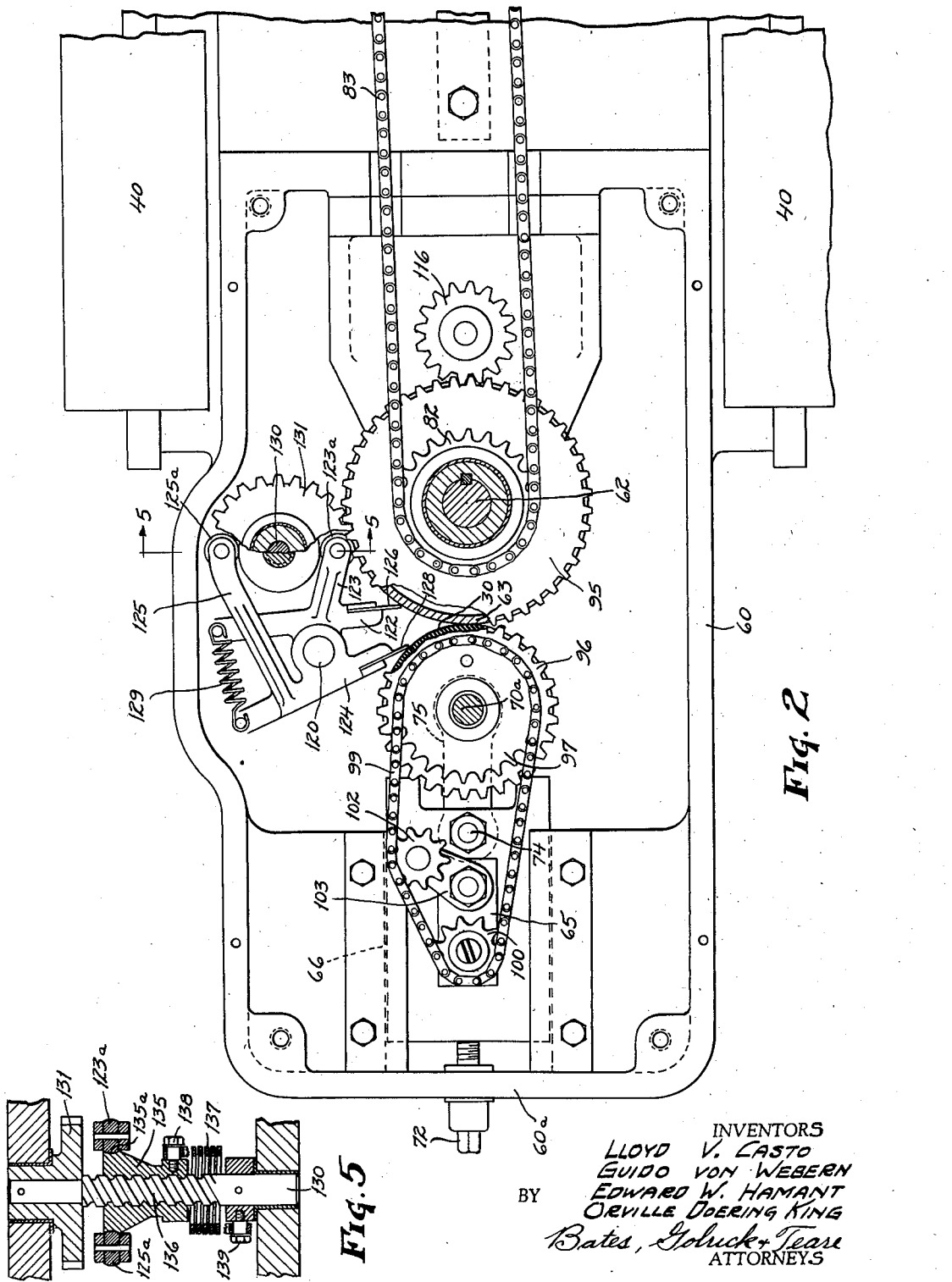
Figure 3:
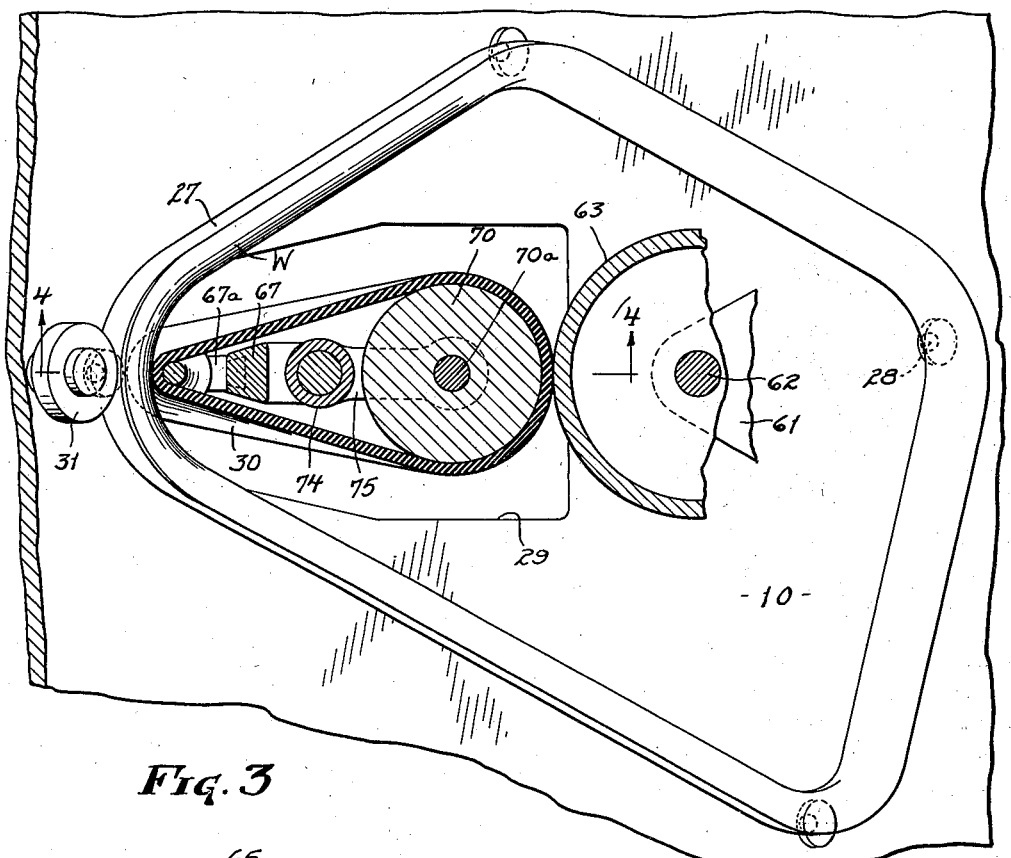
Figure 4:
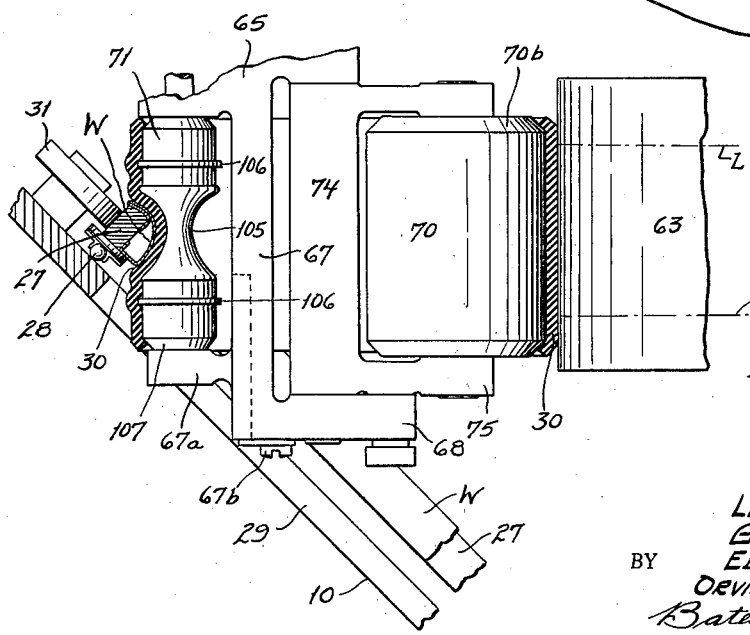
Figure 6:
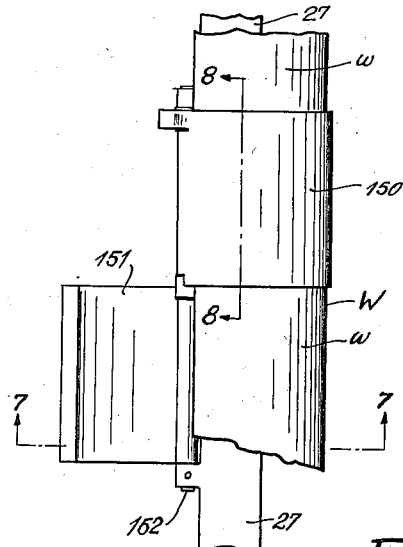
Figure 8:
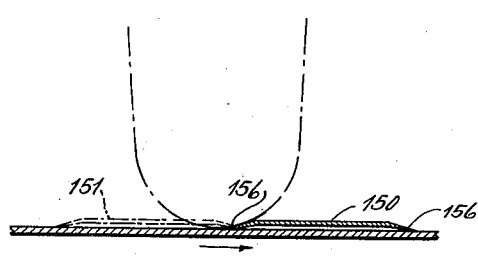
Figure 7:
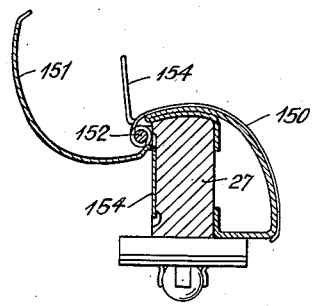
Figure 9:
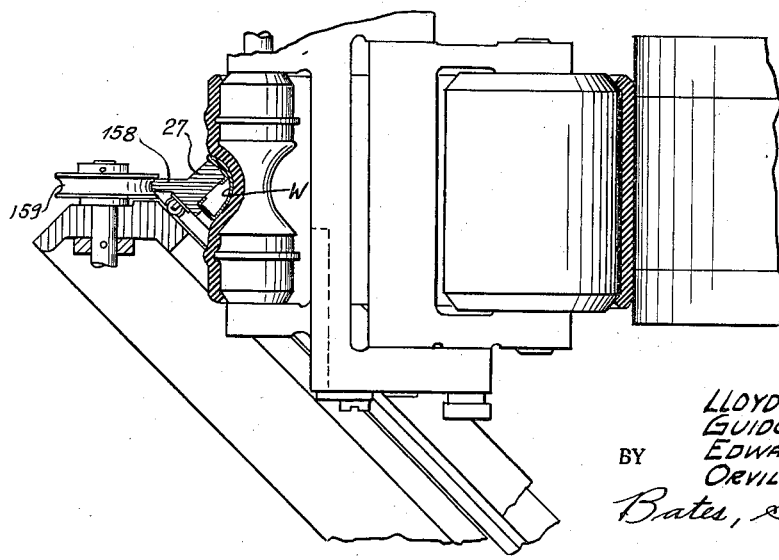

In the drawings, Fig. 1 is a sectional side elevation, showing the essential cooperating parts of the work-decorating mechanism, designed to carry out the method; Fig. 2 is a sectional plan view, taken as indicated at 2—2 on Fig. 1, and showing the relationship of work-decorating elements and driving mechanisms therefor; Fig. 3 is a sectional plan view, taken as indicated at 3—3 on Fig. 1, showing in section one form of work-decorating blanket or belt and exemplary work to be decorated; Fig. 4 is a fragmentary sectional view, corresponding essentially to Fig. 1, but enlarged, and showing the work-applying belt or blanket in contact with the work; and Fig. 5 is a detailed sectional view, as indicated by the line 5—5 on Fig. 2, showing a preferred form of automatic control for a doctor and scraper blade, e. g. Fig. 6 is a fragmentary plan view, showing a portion of a work supporting frame and masking device adapted to guard the work at the beginning and end of the decorative treatment; Fig. 7 is a sectional view thereof, as indicated by the line 7—7 on Fig. 6; Fig. 8 is a sectional detail, as indicated at 8—8 on Fig. 6; and Fig. 9 is a view similar to Fig. 4, showing certain modifications of the work support.

Referring to Fig. 1, the mechanism there shown comprises in general a bed or base frame 1, comprising suitable side frame members 2, one being shown, these members being interconnected by suitable cross-members, such as 3, and a super-structure frame 5 mounted on the bed and comprising side frame members 6 joined together by suitable cross members, one being shown at 7. The side frame members 6 are also rigidly joined together partly by means of the base frame 1 on which the super-structure rests.

The bed supports the work indicated at W and the super-structure 5 supports a work decorating mechanism proper, which is indicated generally at 8.

The bed carries thereon a vertically adjustable table 10, by which the work may be relatively raised and lowered with respect to the decorating mechanism, the table being adjustable as on suitable threaded posts 11, operating in the embrace of adjusting nuts 12, which, as shown, rest on a sub-frame member 13, carried on two of the cross members 3 of the base. The nuts 12 have sprocket wheel formations 14 interconnected by a suitable continuous chain 15, operated as from a master sprocket wheel 16 near the front of the machine (shown at the left in Fig. 1) the latter sprocket being turnable as by a hand-crank 17, carried below the open frame 13, to thereby turn the nuts 12 in the proper direction to raise or lower the table.

Below the work table there is a suitable frame member 20, having a cross-piece 21, carrying a power unit 22 including an electric motor and reduction gear in a suitable casing. The reduction gearing has, in the present instance, drive shafts at opposite sides indicated at 24 and 25. The shaft 24, through suitable connections, to be later described, drives the work to move the same on the support in proper relationship to the decorating mechanism, i. e. the transfer belt 30 and associated parts, and the shaft 25, through other connections, drives the work decorating mechanism.

Referring further to the work table 10, this has a generally flat top surface on which the work is adapted to rest, preferably through the intermediacy of a suitable substantially frictionless carriage, this being shown as an open frame 27, adapted to embrace the work, and, as shown, being of substantially the same shape as the work. The work supporting frame has suitable rollers, such, for example, as inset steel balls 28, adapted to ride on the flat surface 10a of the table, so that, except as controlled by the decorating mechanism, the frame floats freely. It will be noted that at one side of the table the latter is open, as at 29, for receiving a portion of the work decorating mechanism, said portion being indicated in broken lines at 8.

The surface of the work to be decorated is, in the present instance, the curved surface w, and the color transfer blanket or belt 30 (Figs. 1, 3 and 4) operates in rolling contact with such surface to transfer the color material thereto from the color applying apparatus, to be later described. The portion of work being decorated is thereby forced against or in driving relationship to a reaction roller 31, (forming a plate mounted on a vertical shaft 32). This shaft may be supported at its upper end in a suitable boss in the work table, and at its lower end on a bracket 33, on the frame member 20.

The roller 31 may be adapted to directly engage the work itself or the supporting frame 27 (the latter being the arrangement illustrated) and the decorating belt holds the work against the roller 31 with sufficient pressure so that the roller 31 cooperates with the transfer belt to drive the work, eliminating likelihood of slippage, such as might distort the transferred design.

The connections whereby the shaft 24 of the reduction gearing drives the work, includes the vertical shaft 32, the shaft being provided with a bevel gear at 35, meshing with a bevel gear 36 on a horizontal shaft 37, connected as by suitable flexible coupling 38 with the shaft 24. The shaft 32 has a sliding key connection with the bevel gear 35, so that the table may be raised and lowered, with respect to the driving mechanism, while maintaining the driving connection between the roller 31 and the power unit.

Referring now to the work decorating mechanism unit 8, Figs. 1, 2 and 4, this, in the form shown, is swingably mounted as about the cross-shaft 7 on the superstructure frame 6, in order to properly adjust the working surfaces of the belt 30 with respect to the work.

Additionally the entire superstructure may be bodily moved horizontally on any suitable slideway (not shown) or the work table may be horizontally movable for the same effect. Such adjustment will permit greater variations in the horizontal dimensions of moldings, etc. while on the work table.

The adjustment, as shown, includes a swingable head, formed as by laterally interconnected side members 40. One of the members 40 is shown in Fig. 1, the two members being respectively adjacent the frame sides 6, and having arcuate slots 41 concentric with the axis of the shaft 7. To hold the pivot head in adjusted position there are suitable clamping devices indicated diagrammatically at 42, having portions adapted to extend through the slots 41 and into say threaded engagement with suitable openings in the side members 6. The unit may be swung to effect adjustment by a gear device to be later described. The transverse connections for the head members 40 may include a cross-shaft 44, shown in Fig. 1 only.

The contour of both head members 40 may be the same, and this is illustrated in Fig. 1 partly in broken lines (cf. Fig. 2), there being diagonal extensions 45, directed generally toward the work-supporting roller 31 on the adjustable table, said extensions having guiding surfaces indicated by parallel lines 46, which surfaces form slides for a main frame member or head 50 of the work-decorating mechanism unit.

The decorating mechanism unit head 50 is of generally inverted T shape. The leg portion of the T indicated at 51 is disposed parallel to the guiding surfaces 46 and has lateral extensions at 52, see Fig. 2, extending into the guides formed on the heads 40, previously described. The lower face surface 54 of the cross portion of the T (surface facing the work support) is machined to support suitable brackets on which the operating parts of the work decorating mechanism are carried.

For shifting the head 50 in its guide, suitable mechanism may comprise a toothed rack 55 on the underside of the frame portion 51, the rack being operated by an idler pinion 56, suitably mounted on the swingable head 40 and meshing with a gear 58 controlled as by a suitable pedal (not shown) at one side or both sides of the machine. Alternatively, suitable power drive (say hydraulic) may be used to position the unit 8.

A similar arrangement, (shown in broken lines in Fig. 1) may be used to swing the unit 8 about its pivot 7. Such may comprise a gear sector 59 on one of the pivot head plates 40 and a pinion 59a on the frame 6 for operating it.

Referring again to the head 50, it will be noted that the surface 54 carries brackets 60 and 61, these supporting between them, as on a suitable shaft 62, the main pattern element, such, for example, as an etched copper cylinder 63, adapted to carry the intaglio surface, in the event the machine operates as an intaglio printing machine. The bracket 60 extends diagonally downwardly beyond the bracket 61 to a cross portion 60a and carries additional bracket or frame members. These include an adjustable block 65 secured as in guides 66, so as to depend below the underside of the bracket 60 and be adjustable relative thereto toward and away from the pattern cylinder 63.

The block 65 and the members carried by it are adjusted and held in position by a suitable screw device 72 in the cross portion 60a of the bracket 60; see Fig. 2.

The block 65 carries the transfer belt guides, one large and one small roller, 70 and 71, respectively, as shown, which act as pulleys for the transfer belt or blanket 30.

As shown in Fig. 1, the block 65 has a rigid diagonally depending portion 67 extending between the belt guiding rollers or pulleys, the end of said portion being enlarged as at 68 to form oppositely directed arms extending beneath the transverse plane of the rollers. One of the arms carries the lower end of a shaft 73 for the roller 71, the upper end of which shaft is carried in the upper portion of the block and extends to suitable driving means.

As shown, the belt supporting roller 70 is carried on a pivoted yoke member 75, having oppositely disposed arms embracing the roller 70, and having bearings for the roller pintle 70a. The base of the yoke is carried on a pivot shaft 74, secured in opposite portions of the block 65, and the yoke 75 may be swung with respect to the block so as to adjust the tension on the blanket 30. The yoke may be locked in adjusted position by any suitable means, such, for example, as the clamping screw 75.

The belt guiding and tensioning roller 71, which "forms" the belt at the work is shaped (as will later be described) in accordance with the work to be decorated, in other words, so that the belt supported thereon will locally substantially conform to the surface to be decorated. Both rollers and the blanket may be adjusted toward and away from the pattern cylinder by means of the screw device 72 which latter may include appropriate locking means to hold the adjustment.

To facilitate changing the roller 71 so as to readily adapt the machine for decorating work of varying contour, the roller 71 may be detachably carried on the block 65. As shown in Fig. 1, the shaft of the roller is sectional and the lower end of the lower section is carried on a separate detachable bracket 67a which may have its base dovetailed to the block portion 67, the bracket 67a being secured in operating position, as by a suitable abutment device 67b.

Cooperating with the bracket 60 to support the necessary driving gears and sprockets for the rolls, above described, there is a housing member at 80, extending over the entire bracket 60 and suitably bolted thereto. The housing 80, has a bearing boss 81 for supporting the hollow hub of a pattern roll driving sprocket 82, which latter surrounds the shaft 62 for the pattern cylinder 63, and is keyed to the shaft as at the key slot 62a thereof. The sprocket 82 is driven by a suitable chain 83, which is in turn driven by a sprocket 84 carried on a suitable shaft 85 mounted on and extending through the portion 51 of the head 50, of the decorating mechanism unit. The shaft 85 has its lower end suitably drivingly connected with the power mechanism in the base, as by an extensible shaft 87, having universal joints 88 at its ends to permit free swinging of the unit 8 while maintaining the driving connection. The lower universal joint is connected with a vertical shaft 89, which through bevel gearing 90 is coupled with a horizontal shaft 91 connected with the drive shaft 25 of the power unit 22. Conventional flexible shafting (not shown) may be used in place of 87, etc.

Referring again to the pattern cylinder driving sprocket 82, the driving shaft 62 of the cylinder adjacent the sprocket is also keyed to a gear 95, the hub of which is suitably journaled in the bracket member 60. The gear 95 drives a gear 96 and sprocket 97 rigid therewith, said latter gear and sprocket being supported on a shaft 98, carried at one end by the bracket member 60 and at the other by the housing 80. The sprocket 97, through a suitable chain 99, drives a sprocket 100 carried rigidly on the shaft 73, which supports the forming and guiding roll 71 of the transfer belt. A suitable take-up device for the chain 99, shown in the form of an idler 102, and adjustable bracket 103 therefor, may be mounted on the block 65 which supports both belt guiding rollers 70 and 71. This permits the block to be shifted, as above described, in its guides 66.

Referring again to the transfer belt or blanket 30, and its supporting rollers, it will be seen that the roller 70, see Figs. 1 and 4, particularly, is substantially cylindrical throughout its length so as to apply uniform pressure on the inside surface of the belt adjacent the pattern cylinder, but is bevelled at its ends as at 70b, and the side margins of the belt embrace the bevelled surfaces by reason of the elasticity of the belt. This relative flanging between the belt and the roller 70 serves as a guide for the belt, where operating in contact with the pattern cylinder, and prevents the edges of the belt from at any time coming into contact with the cylinder.

The belt guiding and tensioning roller 71 is generally cylindrical in form, is peripherally indented at 105, in general conformance with the contour or configuration of the work W, and has ribs 106 at each side of the central depression, these ribs cooperating with the belt material (by reason of its elasticity) to deter slippage of the belt axially on the form roll. Preferably both ends of the roll 71 are bevelled as at 107, so that the edges of the belt lie in the same relationship to the ends of the form roll, as said edges in respect to the guiding roll 70.

It is to be understood that suitable reinforcement may be provided on the belt. For instance, the inside surface may be rubber, whereas the outer or transfer surface is preferably conventional "gum material", such as congealed glue and glycerin. Moreover, the edges of the belt may be especially reinforced and the belt and its supports may be otherwise modified in accordance with the disclosure of the copending application of Guido von Webern and Edward W. Hamant, Serial No. 37,018, filed Aug. 20, 1935, now Patent No. 2,069,789, Feb. 9, 1937.

Referring to Fig. 4, attention is directed to the fact that the belt is under considerable tension at each side of the work contacting surfaces, and that this tension is gradually reduced toward the region of contact with the relatively highest part of the work. Normally, the belt does not seat on the undercut surface 105. It is found that the belt will decorate such relatively raised and receding surfaced work, with substantially no distortion of image (design) and since the loop of the belt passing over the roll 71 is carried into narow V shape, unusually sharp curves may be decorated without substantial distortion of image, all as part of a continuous operation with no slowing down or speeding up for the corners and straight passes of the work.

The normal contour of the belt over the undercut surface 105 e. g. may be changed by varying the tension of the belt and the belt 30 may be easily changed by releasing the lock 76 for the yoke 75 and swinging the yoke away from the pattern cylinder, thereby relieving all tension on the belt and permitting the belt to be slipped downwardly off both guide rollers.

To apply color material to the cylinder 63, suitable mechanism is used in accordance with the class of printing employed. In the event of intaglio printing, the pigment material (graining paste e. g.) may be contained in a suitable vat or tank 110, see Fig. 1, attached to the bracket 61, and preferably vertically underhanging the bracket and the roll 63 to receive any color material likely to drip therefrom.

A convenient method of feeding the color material from the tank or vat onto the surface of the cylinder 63 comprises, as shown, a tube 111 extending diagonally through a suitable opening in the wall of the bracket 61, so that the lower open end of the tube is immersed in the color material, and the opposite end of the tube lies parallel with the axis of the cylinder and adjacent its pattern surface. Operating in this tube is an Archimedes screw 112, which conveys the color material upwardly in the tube, where it may be discharged as through a suitable spout 113. The point of discharge of the spout is above the margin of the selected portion of the design to be printed, and the color material flows downwardly over the etched surface and is finally spread uniformly thereover, and scraped off, as will be hereinafter shown.

To drive the screw 112, this may have an upwardly extending shaft 115 carrying a pinion 116, meshing with the gear 95, heretofore described, which drives the belt guiding roller 71.

The color material treatment necessary to spread the material properly on the design-bearing surface of the cylinder 63, as well as to remove excess material from the belt after effecting color transfer to the work, is shown in Figs. 2 and 5. In Fig. 2, 120 indicates a suitable stub shaft which may be conveniently mounted on the bracket 60, and to which are pivoted rocker members 122 and 124. The former carries on one of its arms a doctor blade 126, adapted to operate in scraping contact with the pattern cylinder surface. The other rocker carries a similar blade 128, which functions as a scraper to remove material remaining on the blanket after the blanket has applied the design transfer to the work. The rockers 122 and 124 are normally turned respectively clockwise and counter-clockwise to bring the blades into contact with respective surfaces, as by means of a suitable tension spring 129, operating on arm extensions of the rockers.

An important feature of the invention is the arrangement provided for automatically moving the rockers 122 and 124 so as to swing the blades 126 and 128 into contact with the respective surfaces when the machine begins to operate, and which also functions to automatically withdraw the blades from contact with their respective surfaces when the machine is shut down. As shown, this arrangement includes a shaft 130, which may be driven as by a gear 131, fastened on the shaft 130, as indicated in Fig. 5. The gear 131 meshes with the gear 95 on the pattern cylinder shaft 62.

Mounted on the shaft 130 is a conical cam member 135 having an annular trough 135a at the large end. The cam is internally threaded to engage coarse threads 136 on the screw in such manner that the cam turns freely on the shaft at the threaded connection. The cam is drivingly secured to the shaft through a tension spring 137, in the nature of that used on automobile "self-starters", one end of the spring being secured as at 138 to the cam and the other end being anchored as at 139 to a suitable collar on the shaft 130.

The cam 135 is arranged between a pair of arms 123 and 125, on the respective rockers 122 and 124, one arm extending on one side of the cam axis and the other on the opposite side of said axis. The free ends of the arms 123 and 125 carry rollers 123a and 125a which, in the position of the rocker, shown in Fig. 2, are out of contact with the cam by reason of the fact that in this position of the rockers the large end of the cam occupies a position below the rollers, allowing the rollers to approach each other opposite a reduced diameter portion of the cam, being so moved by the spring 129.

The torsion spring 137 is wound in such manner that as soon as the machine is started the relatively rapid motion of the shaft 130 in the direction of the arrow thereon in Fig. 5, acts through the screw and the inertia of the cam to lower the cam against the face of the gear 131 disengaging the trough 135a from the rocker rollers of the arms 123 and 125, and permitting the blades 126 and 128 to move respectively into contact with the cylinder and belt surfaces (Fig. 2). Thereafter, during continued operation, the spring 129 acts through said arms and rollers to prevent the return of the cam to raised position. On stopping of the machine, however, the unwound spring 137 whips the cam back to the position shown in Fig. 5, thereby disengaging the blades 126 and 128 from the cylinder and belt.

The provision for selectively presenting different portions of the etched pattern cylinder surface to the belt 30 may comprise a lever 140 pivoted to the topside of the housing 80 and having a bifurcated arm 141 embracing a collar 142 on the shaft 62 of the pattern cylinder. Suitable means to adjust the lever may comprise a set screw 143 on the other arm of the lever, the lower end of which screw engages an appropriate abutment on the housing 80.

In order to reduce ink smear at the edges of the pattern the pattern cylinder is preferably etched on part of its length only, as between the broken lines L, L on Fig. 4; the cylinder surface beyond the etched pattern being entirely smooth for continuous contact with the doctor blade or other doctor device when used.

Referring to Figs. 6 to 8, we have shown therein one simple form of mask device by which the transferred design may be begun at a definite line and completed at the same definite line with no gap or overlap. This, as shown, comprises two sheet metal mask members 150 and 151, hinged to the work supporting frame 27 as on a pin 152. The masks, as shown, particularly in Fig. 7, may be shaped substantially complementary to the work W, and overlie it for the full transverse extent of its surface to be decorated. The masks may be swung manually to active and inactive positions, 150 being in active position as shown and 15′ in inactive position. Handles, as at 154, may be provided on the masks to assist in moving the masks to the aforesaid positions.

Lengthwise of the work the cross-section of the masks may be as illustrated in Fig. 8, whereas it will be noted that only the downturned edges 156 contact with the work and provide a ramp for the decorating or transfer member (belt 30 e. g.) to ride on and off respective edges of the masks.

In operation one mask is lowered into contact with the work (as in Fig. 8) and the transfer member begins to operate on the trailing edge of the mask transferring the design to the work only after movement of the work carries the work surface into contact with the transfer (work moving in direction of arrow). As the decoration progresses, the mask 150 is swung back and before the end of the operation the mask 151 is swung down over the decorated surface, namely to the position indicated in broken lines,—so that the transfer member cannot repeat its operation on any of the surface covered by the mask 151. The masks are, of course, in substantially edge to edge contact, so that at most only a thin line of demarcation is apparent where the operation is started and stopped, so far as the work surface is concerned. The masks may be two or three inches wide (i. e. lengthwise of the work). In some cases we may use a single mask, mounted in such manner, as on a slide, that its opposite edges occupy a single position, one edge at starting and the other edge at stopping, thus functioning exactly as do the two masks 150 and 151.

In Fig. 9 is illustrated a modification as to the work supporting frame and its supporting roller or platen, whereby the frame is more accurately guided and the reactions of the roller are more nearly balanced with respect to the work. 158 represents a rib which projects continuously from the work supporting frame 27 and 159 is a peripheral groove in the platen roller 31, which guides the frame by means of the rib.

We claim:

1. In a work decorating apparatus, a continuous elastic band of flexible transfer material, guiding means to support the band in contact with a pattern, a band tensioning guide for applying a portion of the band to the work, said guide being so shaped that, at the zone of application of the band to the work, the band is depressed toward the guide with respect to both edges of the band and is under substantially reduced tension.

2. In a work decorating apparatus, a continuous elastic transfer belt adapted to convey a color design from a pattern element to the work, means operating inside the belt to continuously apply a portion of the belt to such pattern element, a pressure device in spaced relation to said means and inside the belt to apply another portion of the belt to the work, and co-operating means to vary the tension of the belt in a manner to change its cross-sectional contour.

3. In a work decorating apparatus, a generally flat elastic transfer belt adapted to be moved into rolling contact with a suitable color bearing pattern, a relatively enlarged pressure device inside the belt to support the belt in contact with the pattern, and a rotary generally cylindrical pressure device inside of the belt for carrying the outer surface of the belt into contact with the work, said pressure device having a peripheral groove opposite the work contacting portion of the belt, which operates to prevent lateral movement of the belt in either direction.

4. In a work decorating machine, having a pattern roll and a continuous band of flexible elastic material, adapted to transfer color material from the pattern to work to be decorated, a means arranged to uniformly support the band in contact with the pattern and a relatively small guide arranged to stretch another portion of the band into generally channeled-shape for application to the work, said guides being movable toward and away from each other to vary the tension on the band.

5. In a work decorating apparatus of the class described, a normally flat elastic belt adapted to transfer a color pattern from a pattern element to the work, a guiding roller for the belt having a reduced diameter portion adapted to receive an edge margin of the belt as depressed by its own elasticity.

6. In a work decorating machine, a support on which generally convex work moves substantially freely, a decorating unit including a continuous flexible transfer belt and support therefor, a pattern element adapted to transfer a color design to the belt at one portion thereof and means to cause another portion of the belt to partially wrap about a convex surface of the work in rolling contact therewith while the work moves on the support.

7. In a work decorating machine, having a pattern and a continuous band of flexible transfer material, operable to transfer a design in color from the pattern to the work, means to continuously support a portion of the band in contact with the pattern, a roller disposed inside of the band and in spaced relation to the supporting means, and means to support an open frame to be decorated in surrounding relation to the roller supported portion of the band and in rolling contact therewith.

8. In a work decorating machine, a work table having a generally flat surface, a work carriage supported for movement on said table parallel thereto, said carriage being adapted to support an open frame to be decorated, a work supporting roller on the table arranged to engage the carriage to support the work, a decorating unit including a transfer member adapted to operate in rolling printing contact with such frame, and means to drive the roller and transfer member at the same effective speed with relation to the work.

9. In a work decorating machine having a pattern element and a work support, a continuous normally flat resilient transfer belt adapted to contact with the pattern element, a pair of rollers for supporting the belt, one adjacent the pattern element and the other adjacent the work on the support, a frame supporting said rollers, including a sub-frame mounting one of the rollers for relative movement toward and away from the other roller and means to lock the sub-frame in a manner to hold the belt under predetermined tension.

10. In a work decorating machine having a pattern member and a work support, a continuous normally flat resilient transfer belt, means to guide and support the belt across substantially its entire width in contact with the pattern member, a mounting for said means adapted to vary the pressure of the belt on the pattern surface, and additional means arranged to place a predetermined tension on the belt and to support a portion of the belt remote from the first-named means in partially embracing rolling contact with the work.

11. A work decorating machine having a support for work to be decorated, mechanism adapted and arranged to apply a decorative transfer to work on said support, said mechanism and support being movable toward each other at an obtuse angle in a direction transverse to the direction of applying such transfer.

12. A work decorating machine having a substantially horizontal work-supporting surface, mechanism above the table adapted to apply a decorative transfer to the work on the supporting surface, said mechanism being movable toward the table in a diagonal direction relative to the plane of the work supporting surface.

13. A work decorating machine having a work support, mechanism including a flexible transfer belt and cooperating pattern element to apply a decorative transfer to work on the support, said mechanism and support being movable toward each other at an obtuse angle.

14. A frame decorating machine, comprising a support having a surface on which the frame to be decorated may be moved, a work guiding and supporting roller on the support adapted to operatively engage one surface of such frame, a decorating unit having a design applicator thereon adapted to operate in rolling contact with an opposite surface of such frame, and means to bring the unit and support relatively toward each other to effect a decorating operation on such frame, said movement being in a direction diagonally of the plane of the work support.

15. In a work decorating machine, a work supporting unit having a substantially flat surface for supporting the work to be decorated, a decorating unit including a resilient transfer member and support therefor, and means interconnecting the units, said means being operable to move the units relatively toward each other to effect decoration on the work, a portion of the decorating unit passing beyond the plane of the said surface at one side of the work.

16. In a work decorating machine, a transfer mechanism including a plurality of rotatable members, including a support for a resilient transfer member, a table on which the work is adapted to move substantially freely, the axes of said members being inclined with reference to the plane of the table and means to bring said mechanism and table relatively toward each other to move the transfer member into operating contact with the work.

17. In a work decorating machine having a pattern member and a work support, a continuous elastic transfer belt, means to guide and support the belt in continuous contact with the pattern member, a pressure roller for stretching the belt into a loop and carrying the stretched portion into contact with the work, a mounting for said means and pressure roller and means swingably to support the mounting with reference to the work support, whereby the angle of approach between the belt and work may be varied.

18. In a work decorating machine, having a rotary pattern member and a continuous band of flexible elastic material adapted to transfer color material from the pattern surface to work to be decorated, a guide to support the band in contact with such pattern, a guide for another portion of the band arranged to stretch such portion into a loop for application to the work, a work support, a unitary support for said guides, and means operative to move the supports relatively toward each other from different angles for application of the looped portion of the band to the work.

19. A work decorating machine comprising a main frame, a work supporting unit including a platen roller adapted to support the work, a decorating mechanism unit having a design applicator arranged to be driven in rolling contact with work on the support, a pivotal connection between one of said units and the frame, whereby the units may be relatively swung toward each other into cooperative relationship to the work, and power means on the frame drivingly connected to the platen roller and decorating mechanism.

20. In a work decorating machine, a pattern cylinder, a continuous flexible belt, means to support one portion of the belt in contact with the cylinder and another portion in contact with the work to be decorated, and mechanism for relatively moving the belt and cylinder in a direction parallel to the cylinder axis selectively to transfer different portions of the pattern by a single transverse zone of the belt.

21. The method of decorating an article of manufacture through the use of an offset printing process, comprising first applying an offset design to be placed upon the work to a flexible print carrying band, then distorting the band with the print outwardly exposed so that the distortion stresses are substantially symmetrically distributed relative to the linear center of the band, and applying the distorted portion of the band to the work in substantially balanced relationship to the central plane of distortion.

22. In a work decorating machine of the class having a pattern element and a work support, a continuous elastic transfer belt adapted to convey a color pattern from the pattern roll to the work on the support, means for holding a portion of the belt in contact with the pattern element, a pressure device arranged to tension the belt and apply another portion thereof to the work, the pressure device being adjustable toward and away from the first-named means and having a groove into which the belt recedes different distances at the point of application to the work depending on the adjustment of the pressure device.

23. In a work decorating machine, a continuous band of flexible transfer material, a rotary pattern adapted to carry a pigment design, a rotary member supporting the band in contact with such pattern, a rotary pressure member for applying a portion of the band to the work, and means including a tension adjustment for the band for maintaining a portion of the band opposite that in contact with the work out of contact with the pressure member.

24. A work decorating machine, having supporting means for work to be decorated, means adapted and arranged to apply a decorative transfer to work on the support, one of said means being movable toward the other at an oblique angle.

25. In a work decorating machine, a work table having a generally flat surface, a work carriage which slidably swings on the table, a decorating unit mounted over the table for operative contact with work supported by the carriage and engaging the work in a lateral direction, and means on the table operatively overhanging a portion of the carriage adjacent the point of application of the decorating unit to the work for maintaining the carriage in contact with the table.

26. A work decorating machine, comprising a frame having a work-supporting surface, a support in a plane above said surface, and a work-decorating unit including transfer means, said unit depending from said support and having a pivotal connection therewith for movement in a plane extending normal to the plane of said surface.

27. A work decorating machine, comprising a frame, having a work-supporting surface, a support in a plane above said surface, a work decorating unit depending from said support and including a decorating member adapted to operate in rolling contact with work on the supporting surface, said unit having a pivotal connection with said support to permit relative approach of the decorating member and the work at various angles, and driving mechanism carried by the unit for operating the decorating member.

28. In a work decorating mechine, a work-supporting frame, a supporting structure extending in an upward direction from said frame, a work-decorating unit having a decorating transfer member adapted to operate in rolling contact with work on the work-supporting structure, said unit overhanging the work-supporting frame and depending from said supporting structure.

29. A work decorating machine, comprising a frame having a work-supporting surface, a supporting structure extending outwardly from said surface, a work-decorating unit carried on said supporting structure and extending toward said surface, said unit comprising rotary decorating transfer members the axes of which extend diagonally with reference to said surface and in a plane normal thereto.

30. A work decorating machine, having a frame provided with means to support work to be decorated, a supporting head mounted for movement on the frame in a plane normal to the work support, a carriage slidably mounted on the head for movement in a plane at right angles to the first plane, and a work-decorating unit including a transfer member, a pattern member, and mechanism connecting the same, said unit being supported on the carriage and having transfer means adapted to operate in rolling contact with work on the work supporting means.

31. A work decorating machine having a frame, provided with a work supporting surface, a support carried by said frame in a plane above said surface, a head pivoted to said support, a carriage mounted to move up and down on said head, and work-decorating mechanism including a printing mechanism supported on the carriage, whereby the mechanism may be lowered toward the work, by movement in intersecting planes.

32. A work decorating machine having a frame, provided with a work support, mechanism including a flexible transfer belt and cooperating pattern elements adapted to apply a decorative transfer to work on the support, said mechanism being movable toward and away from the support at an oblique angle relative to the plane of the support, and supporting means for said mechanism having a pivotal connection with the frame at a point remote from the horizontal plane of the work support.

33. In a work decorating machine, a work support, a frame structure extending away from the work support, a work-decorating head on said structure extending relatively over the work support, work-decorating mechanism slidably carried on said head and including a pattern roll and transfer element adapted to operate in rolling contact with said roll and the work to carry the image of the pattern to the work, and means on said mechanism for adjusting the contact pressure between the transfer element and said roll.

34. A work decorating machine, comprising a work supporting frame having a work supporting surface, a supporting structure on the frame extending out of the plane of said surface, a work decorating mechanism including a transfer member adapted to operate in rolling contact with work on the supporting surface, a carriage for said mechanism mounted in overhanging relation to said surface, slidably carried on said supporting structure, and rack and gear means for adjusting the carriage on said structure.

35. In a work decorating machine, a work support, a supporting structure extending into a plane above the work support, a work-decorating mechanism carried on said structure and depending diagonally over the work support, said work-decorating mechanism comprising a frame, a pattern roll, and rotary transfer element carried thereon, said element being adapted to operate in rolling contact with said roll and the work, and driving gearing connecting the roll and elements, said gearing being carried on the frame and disposed upwardly from the roll and transfer element.

36. In a work decorating machine, a work support, a supporting structure extending upwardly from the work support, a work-decorating mechanism raisably mounted on said structure and comprising a frame which extends over the horizontal plane of the work support, a pattern roll, a flexible transfer belt adapted for contact with the roll and the work, supporting rollers for the belt, said roll and rollers being carried on said frame, means carried on the frame for drivingly connecting the roll and one of the rollers, and mountings for the rollers, so arranged that the belt may be removed in one piece from said rollers endwise of the latter and in a downward direction when said mechanism is in raised position relative to the work support.

37. In a work decorating machine of the class described, a decorating unit comprising a pattern roll and a distortable transfer member of elastic material, supporting means for the member including means to hold the member in rolling contact with the roll and in rolling contact with the work to be decorated, a portion of said supporting means being adjustable relative to another portion in a manner to vary the surface shape of the member locally at the region thereof which is adapted to contact with the work and while said member is out of contact with the work.

38. In a work decorating machine of the class described, a decorating unit comprising a pattern roll, a transfer belt and guiding roller for the belt, said belt being arranged to operate in rolling contact with the work and in rolling contact with the pattern roll, one of said guiding rollers being shaped in a manner to distort the working region of the belt in substantial conformity with the work, and means which is operative on the belt to cause variation of the shape of the working region of the belt supplemental to the distorting effect of the guiding roller.

39. In a work decorating machine of the class described, a decorating unit comprising a base frame which supports a pattern roll, a sub-frame movably carried on the base frame, a transfer member on the sub-frame adapted to engage, by rolling contact, the pattern roll and work to be decorated, the position of the sub-frame governing the contact pressure between the transfer member and roll, and independent means on one of said frames operatively acting on the transfer member in a manner to vary its surface shape in the region in which such surface is presented to the work.

40. In a work decorating machine of the class described, a decorating mechanism comprising a supporting frame, a pattern roll rotatably mounted in the frame, a transfer unit movably mounted on the frame and including a sub-frame and transfer member thereon adapted to operate in rolling contact with the work and in rolling contact with the pattern roll, and means for locking the sub-frame in various positions on the supporting frame.

41. In a work decorating machine having a pattern roll, an endless transfer belt and spaced parallel rollers for supporting the belt, the combination of supporting means for the roll and supporting means for the rollers carried on the first supporting means and arranged in such manner that the rollers are movable toward each other to permit the belt to be removed bodily therefrom endwise of the rollers.

42. In a work decorating machine, a pattern roll, a flexible, endless transfer belt adapted to operate in rolling contact with the roll and with the work, spaced supporting rollers for the belt, a supporting frame in which the roll is journalled, said frame including a roller-supporting portion which is movable relative to the roll-supporting portion to permit separation of the belt and roll and which provides a support for the spaced rollers extending past the belt at one side only thereof, whereby the belt can be removed from the rollers in one piece.

43. In a work decorating machine of the class described, a decorating unit comprising a framework having spaced supports for a pattern roll, a frame extension mounted parallel to the axes of said support, a member pivoted to said extension and having a pair of arms extending laterally from the pivot axis, and rollers for supporting a transfer belt in contact with such roll and for contact with work to be decorated, one of said rollers being carried on said arms and one on a fixed portion of said extension.

44. In a work decorating machine of the class described, a decorating unit comprising a frame work having means thereon adapted to support a pattern roll, a sub-frame movable on the framework at right angles to the axis of a pattern roll supported on said means, a member pivoted to said sub-frame and having a pair of arms extending laterally from the pivot axis, and rollers for supporting a transfer belt in contact with such pattern roll, and in contact with work to be decorated, one of said rollers being carried on said arms and one on a fixed portion of said sub-frame.

LLOYD V. CASTO.
GUIDO von WEBERN.
EDWARD W. HAMANT.
ORVILLE D. KING.